United States Patent [19]
De Rosa

[11] 3,917,023
[45] Nov. 4, 1975

[54] INFLATABLE SUN VISOR

[75] Inventor: Daniel De Rosa, Boulogne-Billancourt, France

[73] Assignees: Regie Nationale des Usines Renault, Boulogne-Billancourt; Automobiles Peugeot, Paris, both of France

[22] Filed: June 13, 1974

[21] Appl. No.: 479,186

[30] Foreign Application Priority Data
July 18, 1973  France .................... 73.26314

[52] U.S. Cl. ........ 280/150 AB; 296/84 K; 296/97 H
[51] Int. Cl.² ......................................... B60R 21/08
[58] Field of Search ... 280/150 AB; 296/97 H, 84 K

[56] References Cited
UNITED STATES PATENTS

| | | | |
|---|---|---|---|
| 3,510,150 | 5/1970 | Wilfert .................... | 280/150 AB |
| 3,552,769 | 1/1971 | Kemmerer et al. .......... | 280/150 AB |
| 3,603,535 | 9/1971 | DePolo .................... | 280/150 AB |
| 3,606,377 | 9/1971 | Martin .................... | 280/150 AB |
| 3,617,073 | 11/1971 | Landsman .................. | 280/150 AB |
| 3,663,035 | 5/1972 | Norton .................... | 280/150 AB |
| 3,690,695 | 9/1972 | Jones ..................... | 280/150 AB |
| 3,721,456 | 3/1973 | McDonald .................. | 280/150 AB |
| 3,791,476 | 2/1974 | Wernig .................... | 280/150 AB X |

FOREIGN PATENTS OR APPLICATIONS

| | | | |
|---|---|---|---|
| 1,214,327 | 12/1970 | United Kingdom ............ | 296/97 H |
| 1,264,275 | 3/1968 | Germany ................... | 280/150 AB |

Primary Examiner—David Schonberg
Assistant Examiner—John P. Silverstrim
Attorney, Agent, or Firm—Fleit & Jacobson

[57] ABSTRACT

This invention relates to means for protecting the passengers of motor vehicles in case of strong decelerations, notably during a crash. This device comprises, notably in the sun visors, body elements such as doorjambs, edges of window and door frames, etc..., as well as in any other aggressive elements of the passenger compartment of the vehicle, multiple energy-damping inflatable means consisting of bellows inflatable and enclosing a miniaturized generator of gas under pressure, one portion of said bellows being rigidly fastened to the corresponding aggressive element, the other portion being adapted to be easily and readily released during the inflation.

2 Claims, 6 Drawing Figures

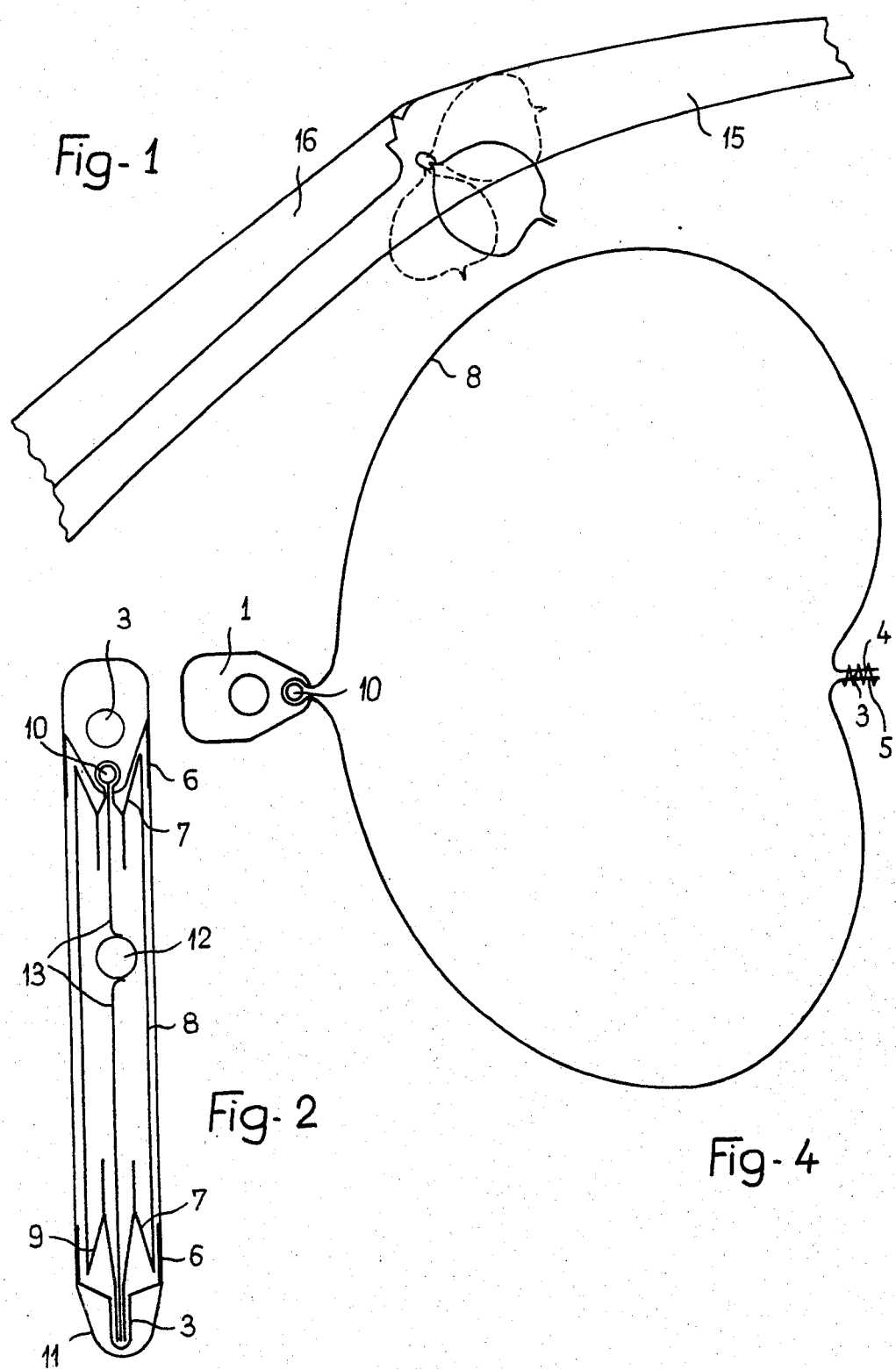

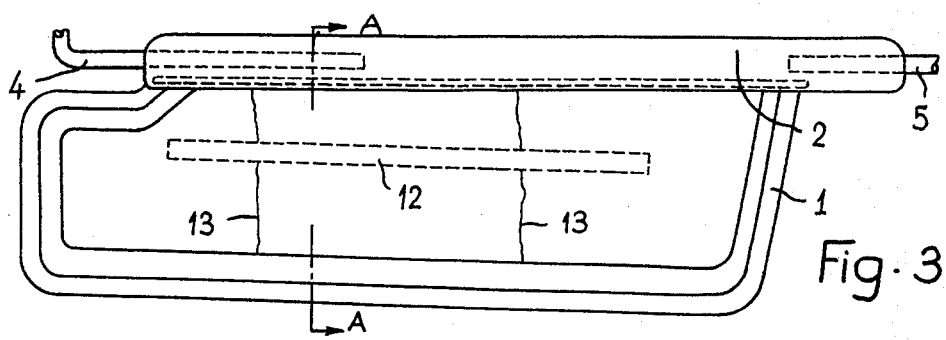
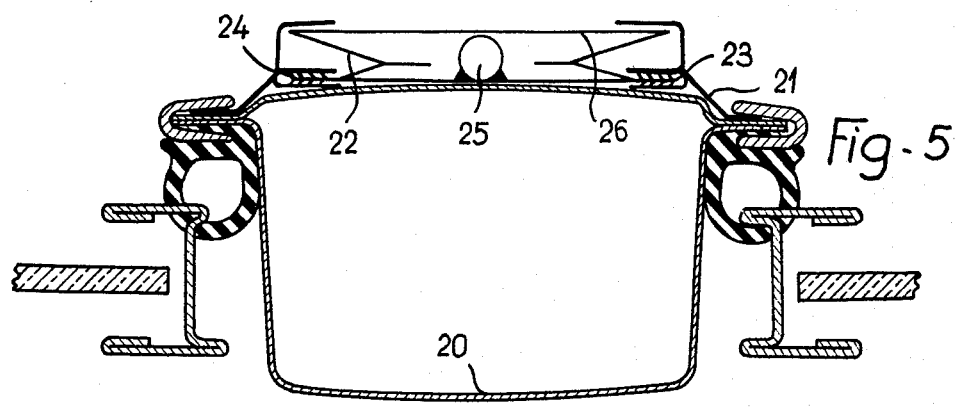
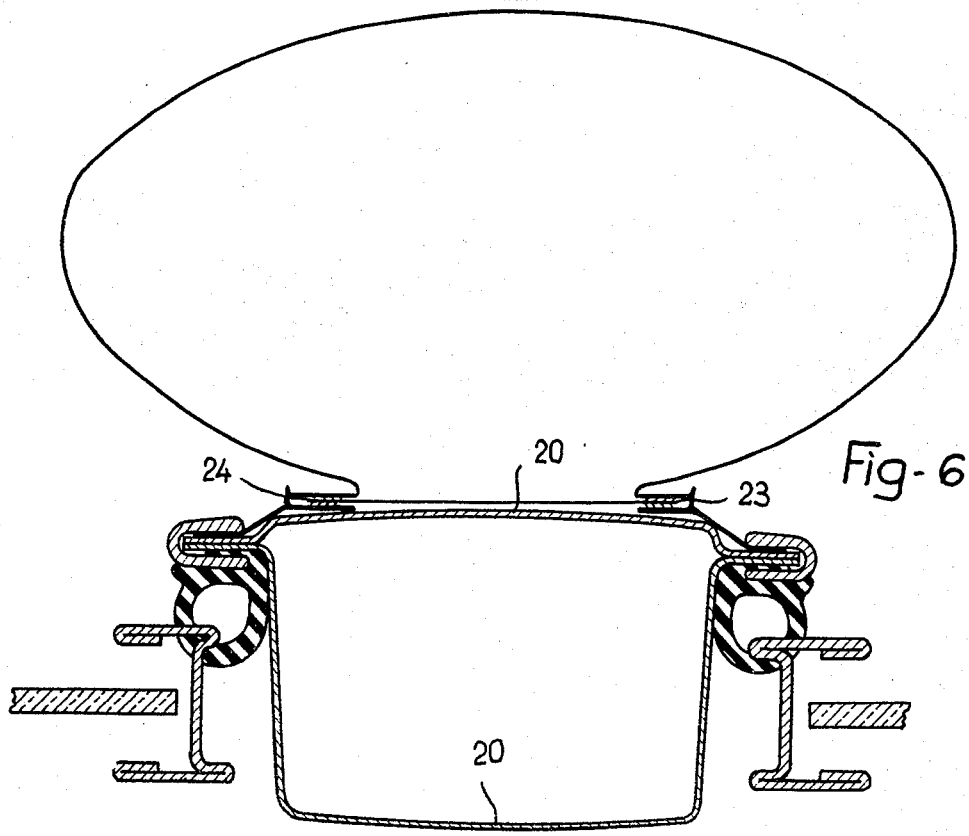

INFLATABLE SUN VISOR

The present invention relates to means for protecting the passengers of motor vehicles and more specifically to a device for protecting the occupants of automotive vehicles, said device mainly comprising multiple inflatable elements.

Protection devices comprising inflatable bladders normally stowed away in the deflated condition in a compartment located as a rule within the facia board or instrument panel are already known. In case of very strong deceleration of the vehicle, a gas generator connected to the inner volume of the bladder is released to introduce gas into this volume in such amount that the bladder is rapidly inflated. Thus, the bladder expands in front of the occupant of the vehicle and absorbs the kinetic energy developed by the occupant himself when the latter strikes the bladder.

Although the basic principle of devices of this general character appears to be advantageous at first sight, its practical application is objectionable in that it cannot protect the passenger efficiently unless he or she is exactly in front of the bladder when the crash occurs, so that the occupant decelerates on the bladder, without impinging before-hand on objects likely to hurt him during his movement.

This requirement is not met notably in such cases where the shock is applied more or less obliquely or laterally, or under certain conditions, for instance when elements such as the sun visors are lowered and present an agressive free edge.

It is the essential object of the present invention to provide an improved arrangement of such inflatable bladders in a safety device of the kind set forth hereinabove, which is characterised in that relatively small shock-damping bladders are provided on any element likely to constitute a potential source of agressiveness in case of crash, notably (without limiting the scope of the invention to this only exemplary list) sun-visors, car body elements, door elements, especially at the lower edge of the lateral window, instrument panel, etc.

This invention is concerned more particularly with a device for protecting the passengers of a motor vehicle, which is characterised in that it comprises a plurality of energy-damping inflatable means disposed either in the sun visors, the side members of the car body, or any other potential agressive part of the passenger compartment of the vehicle, said means mainly comprising bellows adapted to be expanded under predetermined conditions and incorporating a miniaturized generator of gas under pressure, one portion of said bellows being rigidly attached to the agressive element whereas the other portion can easily be released from its support during the bellows inflation. These small shock-damping means, which are variable in number, consist essentially of normally collapsed bellows of which one portion is rigid with the potentially agressive member to be neutralized, said bellows enclosing a gas generator in the form of a stick of explosive powder the firing of which is adapted to be controlled by means of an inertia-type electric switch or any suitable similar device.

A clearer understanding of the present invention will be had as the following description proceeds with reference to the attached drawings, in which:

FIG. 1 is a diagrammatic view illustrating in its operative position the energy-damping device incorporated in a sun visor;

FIG. 2 is a cross sectional view taken along the line A—A of FIG. 3, showing the device of FIG. 1 in its inoperative position;

FIG. 3 is a front elevational view of the device of FIG. 1, also in its inoperative position;

FIG. 4 is a detail view of the device of FIG. 1;

FIG. 5 is a section showing an energy-damping device in its inoperative position and incorporated in an element of the car body, and FIG. 6 is a section similar to FIG. 5 but showing the energy-damping device in its inflated condition.

The energy-damping device, notably for sun visors, according to this invention comprises a plastic section member 1 having just the stiffness necessary for keeping the device in its original shape, the upper side 2 of this section member 1 comprising a tubular passage 3 engageable by a mounting rod 4, 5.

As clearly shown in FIG. 2, the section member 1 comprises inwards marginal portions 6 clamping the edges 7 of the bellows 8 formed with a number of folds 9 affording a considerable increment in the volume of the device when operative. The bellows comprise a strong non-elastic material having a porosity sufficient to permit the passage of gas therethrough under certain conditions.

As illustrated in FIG. 2, the upper edge of the bellows is rigidly secured to the marginal portion of the sun visor through any suitable means 10, and the opposite edge 11 as well as the side edges of the bellows are simply fastened temporarily by means of clips or the like to the plastic section member 1. A gas generator 12 is secured in position by means of fasteners 13 within the bellows 8. This generator is characterised by very small dimensions, a generally tubular configuration and the capacity of releasing when ignited an amount of gas sufficient for filling the bellows under a suitable pressure. This gas generator comprises a cylindrical tubular case of textile material surrounding a propergol sheet enclosing in turn the gas-generating ignition powder. At one end, this tubular case is connected to an electric ignition device and at the opposite end it comprises a cylindrical extension in which spaced orifices are formed to afford a proper distribution of the released gas.

FIGS. 1 and 4 illustrate the sun visor in its operative position. The bellows 8 having been inflated to the maximum volumetric dimensions the bellows ends opposite those secured by said means 10 are substantially released from the flexible section member 1. As clearly apparent from FIG. 1, the volume thus obtained is efficient irrespective of the sun visor position at the time the crash occurs, i.e. whether it contacts the roof 15 or the windshield 16, or is in any intermediate position therebetween.

FIGS. 5 and 6 illustrate a modified embodiment of this invention, in which the device is associated with the side elements of the car body, notably the central jamb or post 20 between two lateral doors of the same side of the vehicle.

In these Figures, it is clearly apparent that a support 21 for example of flexible synthetic or plastic material is secured to the inner face of said door jamb 20, this support 21 having however a strength just sufficient to hold the bellows 22 in the inoperative condition thereof. As in the preceding example, one portion of bellows 22 engaging the door jamb 20 is rigidly secured thereto as shown at 23, 24, and the opposite face 26 of the bellows can easily be released from the edges of support 21 under the action of the gas pressure developed in the bellows, to assume the position shown in FIG. 6. This arrangement also comprises within the bellows the small cylindrical gas generator 25 adapted to cause the rapid expansion of the bellows to which said generator is secured on the side adjacent the door jamb 20, as shown.

These miniaturized protection devices may be provided in great number within the passenger compartment of the vehicle, notably along the upper edge of door panels, on the projecting portions of the instrument panel and facia board, etc.

These various inflatable devices may be released to their operative condition either by means of a single electric switch of the inertia-responsive type, common to all the inflatable devices, and so connected thereto that closing the energizing electric circuit of the ignition means will generate a spark at the proper location of each device, or by means of separate contacts forming an integral part of each inflatable device. Moreover, the ignition can be controlled either manually or automatically by the shock itself.

Although specific forms of embodiment of this invention have been described hereinabove and illustrated in the accompanying drawings, it will readily occur to those skilled in the art that various modifications and changes may be brought thereto without departing from the scope of the invention as set forth in the appended claims.

What is claimed is:

1. Device for protecting the passengers of a motor vehicle, comprising: a sun visor; a multiple energy-damping inflatable means disposed in the sun visor and consisting of a support unit comprising a bellows structure adapted to be either spread or expanded, and provided with a gas generator consisting of a stick of explosive powder, one portion of said bellows being rigidly secured to the sun visor from which the passengers are to be protected, and the other portion being releasably secured to said support for releasing said other portion during the inflation of said bellows, said gas generator being adapted to be released electrically by means of an inertia electric switch or any other similar device.

2. A device for protecting the passengers of a motor vehicle from impact with an edge of a sun visor comprising:
a sun visor having one end connected to a motor vehicle and comprising a section member around the outer edge of said visor;
a first securing device in said section member located on said one end of said visor and a second securing device in said section member located on the other end of said visor;
an expandable bellows structure disposed in said visor and rigidly secured to said one end by said first securing device and releasably secured to said other end by said second securing device, said second securing device releasing said bellows from securement thereby to said visor during expansion of said bellows;
a gas generator means secured in said bellows structure for expanding said bellows structure; and
actuating means for actuating said gas generator means.

* * * * *